United States Patent [15] 3,688,312
Gustafson et al. [45] Aug. 29, 1972

[54] INTEGRATED DISPLAY SYSTEM FOR COMBAT AIRCRAFT

[72] Inventors: Walter R. Gustafson, Furlong; William H. McMillen, Perkasie; Jackson Kemper, Jr., Ivyland, all of Pa.; Leonard Newman, White Plaines, N.Y.

[73] Assignees: Loral Corporation, Scarsdale, N.Y.; by said Newman; The United States of America as represented by the Secretary of the Navy, ; by said Gustafson, MacMillen, and Kemper

[22] Filed: Jan. 7, 1970

[21] Appl. No.: 1,242

[52] U.S. Cl. ............................ 343/6 R, 343/5 EM
[51] Int. Cl. ......................... G01s 7/22, G01s 9/02
[58] Field of Search .................... 343/5 EM, 6 TV

[56] References Cited

UNITED STATES PATENTS

| | | | |
|---|---|---|---|
| 3,543,269 | 7/1968 | Dudley | 343/5 EM |
| 3,537,096 | 10/1970 | Hatfield | 343/5 EM |
| 3,331,069 | 7/1967 | Cornell et al. | 343/5 EM |
| 3,185,980 | 5/1965 | Gustafson et al. | 343/6 |

FOREIGN PATENTS OR APPLICATIONS

| | | | |
|---|---|---|---|
| 841,045 | 7/1960 | Great Britain | 343/6 TV |

*Primary Examiner*—Malcolm F. Hublew
*Attorney*—Richard S. Sciascia, Henry Hansen and Charles E. Temko

[57] ABSTRACT

An integrated display system for increasing the operational effectiveness of aircraft in the performance of antisubmarine warfare missions. The disclosed embodiment provides a tactical coordinator concept as a means to achieve effective analysis of sensory data and stimulate optional decision making for the search and attack phases of the mission. This reduces the burden on the pilot and permits inclusion of a bright radar display at the pilot station. Coordinated presentation of navigational and tactical data is provided on cathode ray tube displays at both tactical coordinator and pilot stations.

6 Claims, 20 Drawing Figures

$t_o \leq 1 \mu$ SEC
$t_d \leq 0.5\ t_o$
$T_T \geq 10.5\ t_o$

Fig.18

INTEGRATED DISPLAY SYSTEM FOR COMBAT AIRCRAFT

The invention described herein may be manufactured and used by or for the Government of the United States of America for governmental purposes without the payment of any royalties thereon or therefor.

This invention relates generally to the field of airborne integrated display systems of the types disclosed in the W. R. Gustafson et al patents Nos. 3,185,980 dated May 25, 1965; and 3,380,028 dated Apr. 23, 1968, and more particularly to an improved construction thereover particularly suitable for use in aircraft having relatively small crews.

An extensive survey of the tactical requirements and system interface on operational antisubmarine warfare helicopters has indicated the desirability of an automated and rapid transfer and display of tactical and navigational data which enhances the performance of the aircraft. It is desirable that all of such data be available to that member of the crew responsible for the making of tactical decisions, so that such decisions may be made with maximum availability of current data.

Conventional prior art equipment has normally consisted of one tactical sensor, in the form of a Dip Sonar, in addition to a Doppler/dead-reckoning navigation system for the guidance of the aircraft. This equipment usually includes an electromechanical plotter in the pilot/co-pilot area which presents relative navigation position relative to starting and datum points and target position marks relative to present position. Range and bearing are read by the pilot and manually inserted into a control box for entry onto the electromechanical display.

Such systems are slow, relatively inaccurate, and have a system "dead time" sufficiently high to preclude weapon commitment against even conventional submarines running at high speed, thus making necessary the presence of two aircraft to perform an antisubmarine warfare mission. In addition, valuable pilot/co-pilot attention to safe flying is delegated to the study of sensor and navigation displayed data, thereby detracting from the attention of the physical environment of surrounding aircraft and ships increasing the flight hazards.

It is therefore among the principal objects of the present invention to provide an improved display system in which the above mentioned disadvantages have been substantially eliminated.

Another object of the invention lies in the provision of an improved system which may be principally controlled by a single member of the crew (referred to hereinbelow as the tactical coordinator) in such manner that available pilot time for guiding the aircraft is at a maximum.

A further object of the invention lies in the provision of an improved display system having increased display capability as contrasted with prior art devices, including the ability to simultaneously display fresh and stored data from a large number of data sources.

These objects, as well as other incidental ends and advantages, will more fully appear in the progress of the following disclosure, and be pointed out in the appended claims.

In the drawings, to which reference will be made in the specification, similar reference characters have been employed to designate corresponding parts throughout the several views.

DESCRIPTION AND OPERATION

Before entering into a detailed consideration of the various elements comprising the disclosed embodiment, a brief discussion of the function of the entire device is considered apposite.

Figure 1:
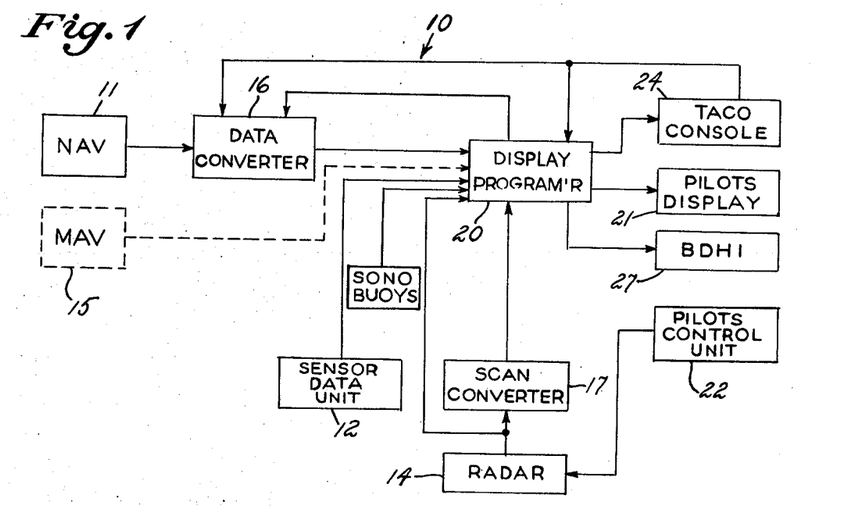
FIG. 1 is a block diagram of an embodiment of the invention.
Figure 7A:
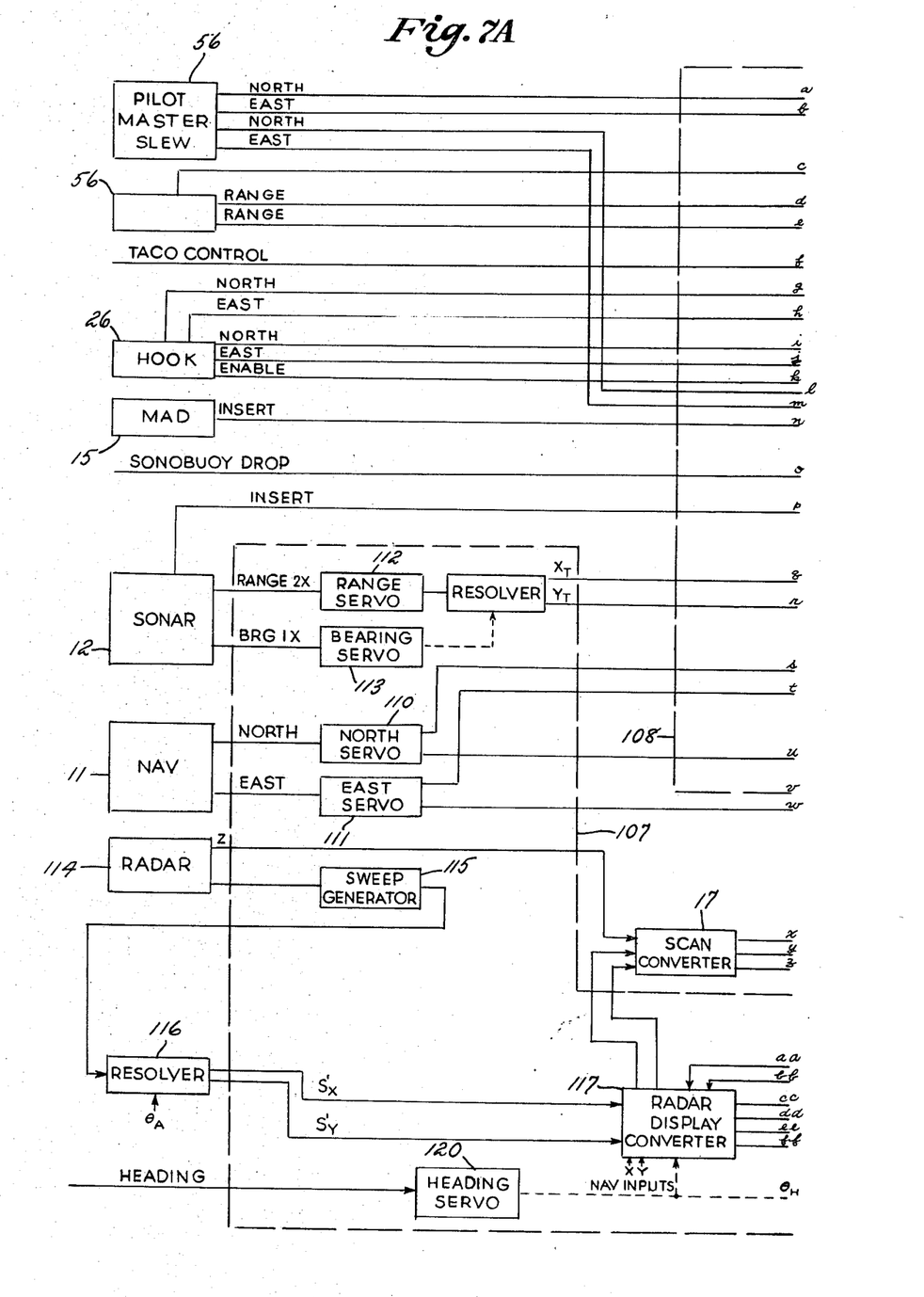
FIGS. 7A and 7B are detailed system block diagrams.
Figure 7B:
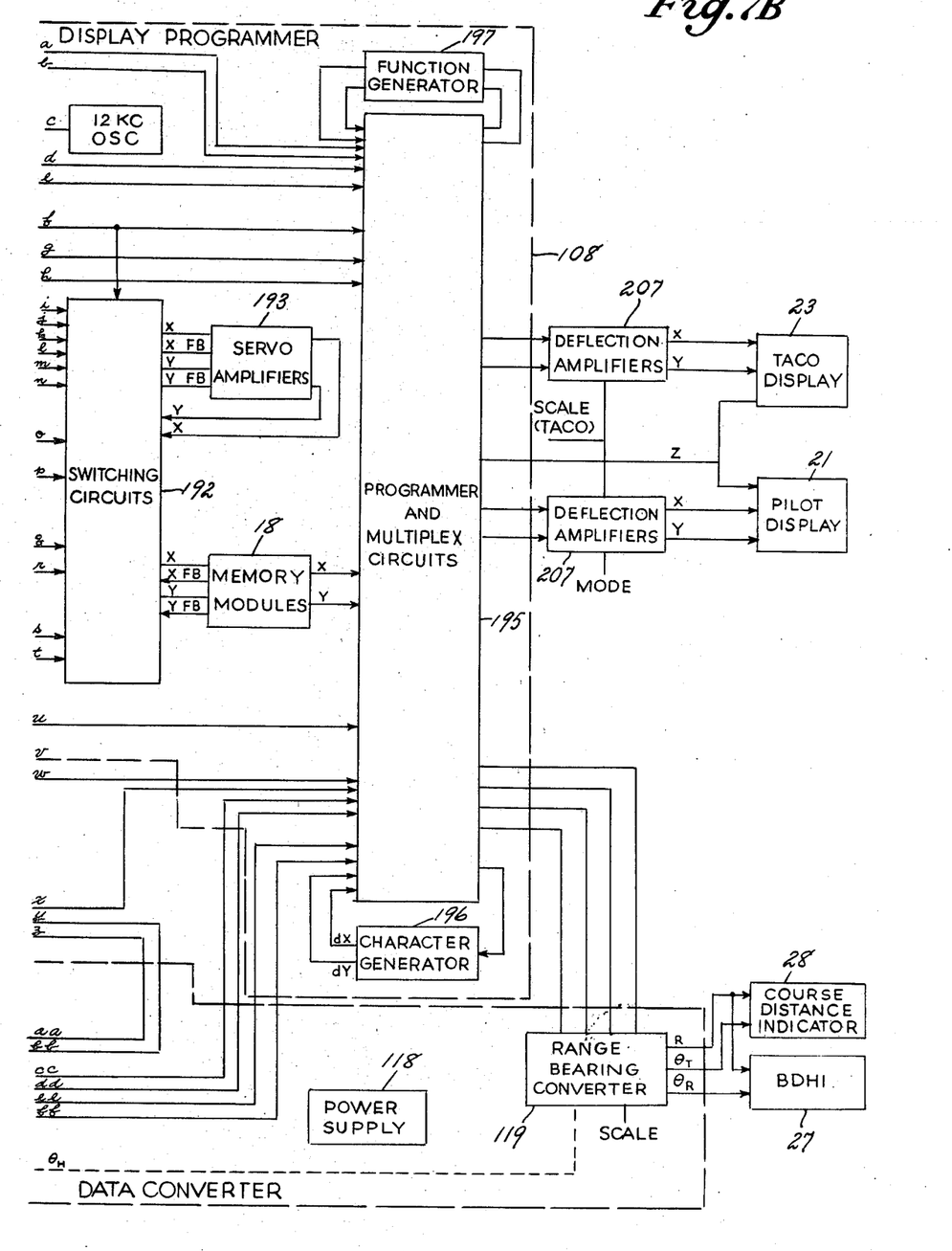

With reference to FIG. 1 in the drawings, the device, generally indicated by reference character 10, is capable of handling information from a plurality of sensors, such as a navigation sensor 11, a sonar sensor 12, sonobuoys 13, radar 14, and magnetic anomaly detector 15 (MAD). Inputs from sonar 12 are processed by a sonar data converter 16 prior to entry into the memory and memory control element 18 (FIG. 7).

For each bit of data stored in the memory and memory control 18, the programmer 20 can select the proper symbol, alpha-numeric, or function from symbol, alpha-numeric, function generator 19 (FIG. 6) as automatically determined or preassigned or as assigned by the tactical coordinator display control 24 (FIG. 7), couple it with the particular data obtained at this instant from memory, and display the combined information on the tactical coordinator's display 23 and/or the pilot's display 21. The programmer 20 does this on a rapid sample basis for each of any number of memories contained in the memory control 18. The cycling through all stored information is done by the programmer 20, at a rate rapid enough to provide flicker-free display on the tactical coordinator display 23 and pilot display 21. In addition, the programmer 20 upon request via the tactical coordinator display control 24, can time share for display purposes between a period provided for the data coming in via the scan converter 17 and a period allocated for sampling the data stored in the memory and memory control 18, so that both real time raw sensor data and stored data may appear on the displays simultaneously.

The crew member designated as tactical coordinator, via the display control 24 and vector select control 26 may vector between any two points appearing on the tactical coordinator display 23. The programmer 20 will select the proper function, in this case a straight line, from the symbol, alpha-numeric, function generator 19 and cause it to appear on the displays 21 and 23. The range and bearing between these two selected points will be computed and appear on the pilot bearing distance heading indicator (BDHI) 27 and the tactical coordinator BDHI 28.

The symbol, alpha-numeric, function generator 19 can provide specific symbology for hook, present position, point of departure and datum points; alpha-numerics for portraying sensor information each time an entry is made from the sensors 12, 13, 14 and 15. In addition to position information, range rings and vectors may be portrayed around a desired point. These functions are obtained from the function generator portion of the generator 19.

The tactical coordinator display control 24 provides the necessary selection of hooking, selecting, category of data entry or blanking, scale selection, data entry, vectoring and data transfer to the pilot display. It is to be noted that with change of scale for display and tactical purposes, relative positions of the displayed data are not lost, although some data may be positioned off the face of the cathode ray tube.

The scan converter 17 may be one of a number of devices which provide simultaneous data entry and readout. This may be by way of a double-ended storage tube, or a cathode ray tube with vidicon or permacon type television camera pickup.

Thus, the disclosed system is a hybrid analog-digital device which coordinates and relates the date acquired by the various components comprising the antisubmarine warfare system aboard a combat aircraft. The display group provides composite cathode ray tube displays of data from the above mentioned sensor equipments to both the tactical coordinator and the pilot. At the start of a problem, navigational data, including base and destination locations, as well as aircraft present position are manually inserted as north-south and east-west grid positions, memorized and displayed as distinctive symbols on both displays. Aircraft present position is then continuously up-dated as the aircraft moves. Radar data and tactical data from the sensor equipment are automatically transferred to the display group, entered into memory and displayed at both display stations. Radar and tactical displays are identified as to source by alpha-numeric characters. Hook points that fix a position on the display may be established and also displayed. Vectors may be generated and displayed between any two display points of interest. Range and bearing of a displayed vector may be read out on a course and distance indicator (CDI) consisting of counter indicators.

PILOT STATION

The pilot station, or more correctly, the pilot-co-pilot station with regard to the disclosed system, requires the display of such navigational and tactical data as is required to guide the pilot in an effective tactical antisubmarine warfare mission, and improve the flight safety aspects of the aircraft operation.

Figures 2, 3:
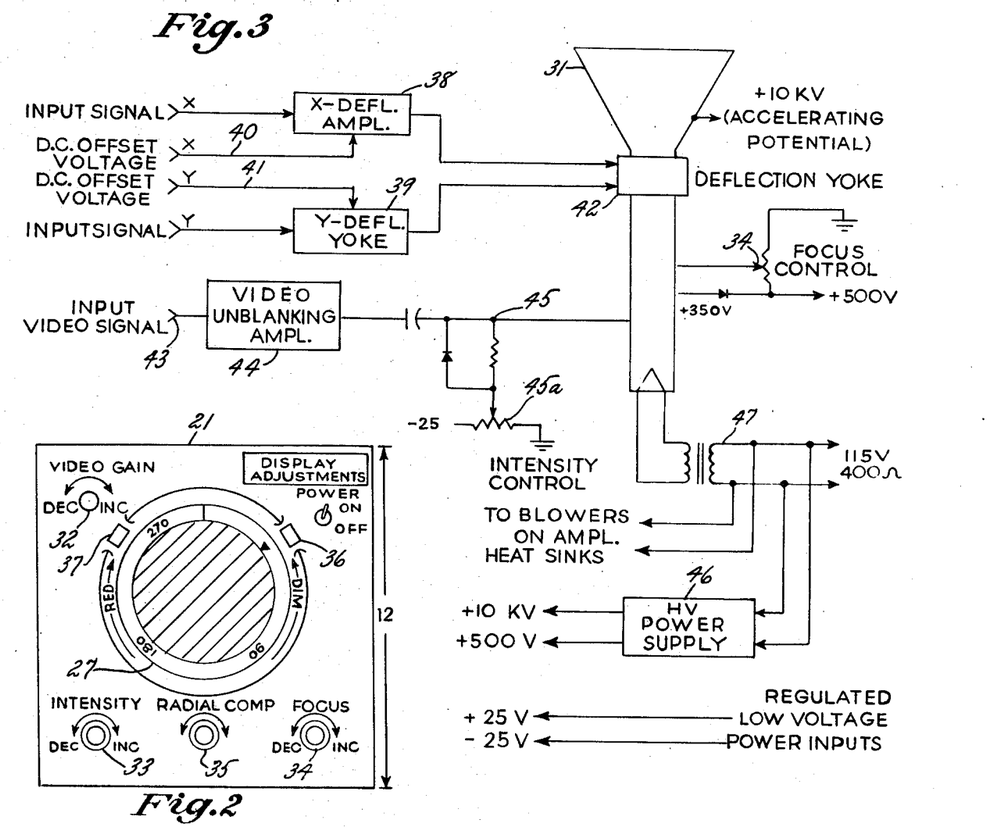
FIG. 2 is a view in elevation of a pilot display which forms one element of the embodiment.
FIG. 3 is a schematic functional diagram of the pilot display.
Figure 4:
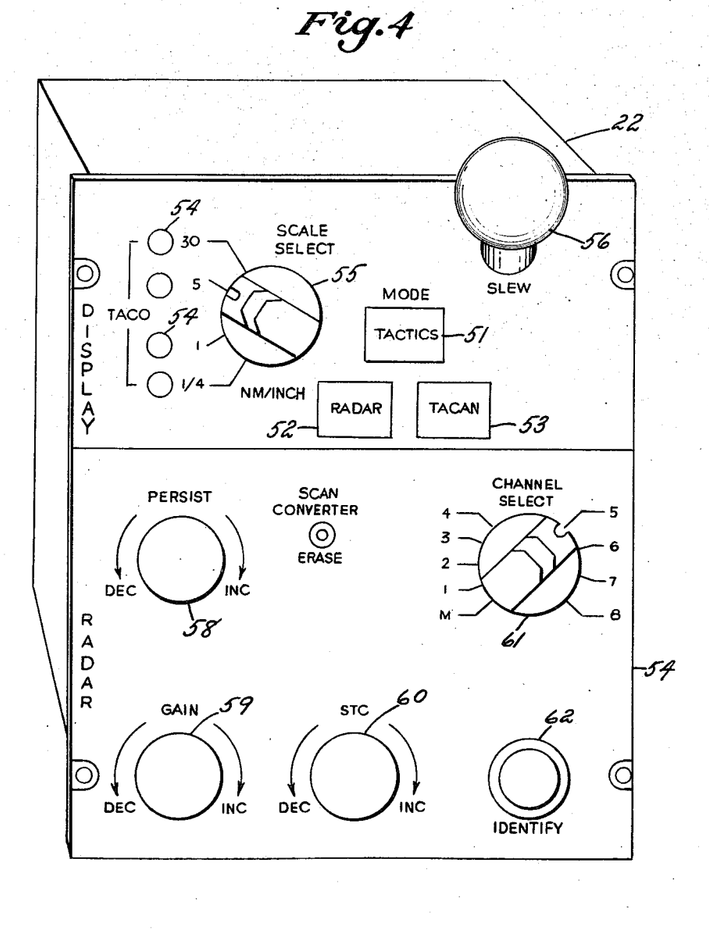
FIG. 4 is a front elevational view of a pilot control unit.

To this end, the pilot display 21 (FIG. 2) operates in conjunction with a pilot control unit 22 (see FIGS. 2, 3 and 4). The pilot display comprises a nine inch cathode ray tube presentation of navigational and tactical data and is preferably situated between the pilot and co-pilot to be conveniently viewed by either person. The display provides for manual front panel control of video gain at 32, as well as an intensity control 33 and a focus control 34. A radial comprehension control 35 adjusts the size of the viewed area to that which can be encompassed by the face of the tube. A polarized filter 36, and red polarized filter 37 facilitate viewing for high ambient light conditions and night viewing, respectively, and a manually set circumferential rotating compass reference card 27 may also be included. The controls thus provided on the display may be regarded as "housekeeping controls" and reference settings in the pre-flight preparation for the tactical mission. All tactical controls for the display are housed in the pilot control unit 22, which is located below the display, and preferably on one side thereof to be conventionally operated.

FIG. 3 is a function block diagram of the pilot display unit 30. The cathode ray tube 31 is most conveniently of electrostatic focus type, with 70° magnetic deflection, and is preferably provided with a laminated face plate for implosion proofing. As provision is made for converting raw radar reception to scan-displayed radar, an aluminized high efficiency phosphor is employed with a 10 kv screen accelerating potential to produce a bright display. With this equipment, the light output of the tube is in the order of 250 foot Lamberts with a spot beam size of 0.012 inch.

The tube and its deflection yoke 42 are driven from "X" and "Y" deflection amplifiers 38 and 39, respectively. Provision is made for offset voltage inputs 40 and 41, so that the deflection yoke 42 responds to an operator initiated shift in the cathode ray tube presentation about any desired reference point.

Video input signals 43 are accepted by a video unblanking amplifier 44, which are amplified, and inverted and fed to a clamping circuit 45 which maintains intensity level, and then applied to the cathode ray tube grid for Z-axis modulation. A video unblanking level control 45a may be added to allow variation in the individual character brightness.

The high voltage power supply 46, filament transformer 47 and blowers (not shown) on the amplifier heat sinks are all powered through 115 volt 400 cycle current.

Referring to FIG. 4, the pilot control unit 22 serves as the prime tactical control for the display 21 as well as the sensory control of the prior art radar receiver with which the device 10 is used. The control unit provides the pilot with independent control of his display. HOwever, in the tactical mode, the pilot display becomes a repeater of the memorized data selected by the tactical coordinator for transfer to the pilot.

Mode selection of tactical data is provided by three control push-buttons 51, 52 and 53, entitled TACTICS, RADAR, and TACAN located in the upper portion of the control unit. It should be noted, however, that logic interlock circuitry will inhibit RADAR when TACAN is depressed, and vice versa. The TACTICS control will provide the ground-stabilized tactical-navigation display as determined by the tactical coordinator. Radar data will be superimposed in a ground-stabilized, North-oriented display centered about the continuously changing present position of the aircraft when RADAR is selected. The selection of the TACAN mode will automatically inhibit radar display regardless of the TACTICS mode. However, if RADAR data is selected without TACTICS, the radar display will be an aircraft-stabilized, heading-oriented display centered on the cathode ray tube. In the TACAN mode, the display will be responsive only to the TACTICS mode switch while enabling the TACAN equipment external to the system. Indicator lights 54 are provided to inform the pilot of the tactical scales selected by the tactical coordinator. A rotary scale selector switch 55 is provided adjacent these lights for the independent scale selection of the pilot. A joystick slew control 56 permits the pilot to select the tactical center of his presentation. The following table summarizes the mode logic of the pilot control and the resultant display format.

PILOT CONTROL MODE LOGIC

| Tactics Mode | RADAR/TACAN mode | Resultant Pilot Display |
|---|---|---|
| | OFF | Blank Screen |
| | RADAR ON(TACAN off) | Aircraft-stabilized, heading oriented, scan-converted radar display |
| OFF | OFF | Blank Screen |
| | TACAN ON(RADAR off) | Blank Screen |
| | OFF | Tactical-Navigation display |
| | RADAR on(TACAN off) | Ground-stabilized, tactical-navigation display with North-oriented, scan-converted radar superimposed |
| | OFF | Tactical-Navigation Display |
| | TACAN ON(RADAR off) | Tactical-Navigation Display |

The lower portion of the pilot control unit 22 is allocated to the prime sensory control of radar, and, together with the scale selector switch 55 incorporates all control functions of the azimuth-range indicator (not shown) the details of which are known in the prior art. The pilot display will serve as the prime radar display when the RADAR mode is selected.

Referring to the lower portion 54 of the control unit, a persistence control 58 regulates the display persistence of the radar channel scan-converter 17. A gain control 59 provides for optimizing the display in varying environments. A control 60 labeled STC provides for control of the receiver gain as an inverse function of radar distance to maintain uniform intensity of target returns.

Since present radar equipment also serves as a station keeping sensor via interlock with TACAN transponder radio sets (also known in the art), station keeping controls for the radar are provided at the pilot control unit 22. A channel select rotary switch 61 provides for the time-sharing channel identification between up to eight aircraft, and the identify push-button 62 provides for the double-beacon reply to the cooperating aircraft. The scale selector switch 55 also serves to establish the scale of the radar operation.

TACTICAL COORDINATOR STATION

The tactical coordinator (TACO) is the designated member of the crew who serves as prime control and decision maker for the antisubmarine warfare portion of the mission. Tactical sensor data is supplied by the sensor operator, and radar data is obtained from the radar equipment. The tactical coordinator reviews and coordinates all data on his display for use in making tactical decisions and establishing vectoring information.

Figure 5:
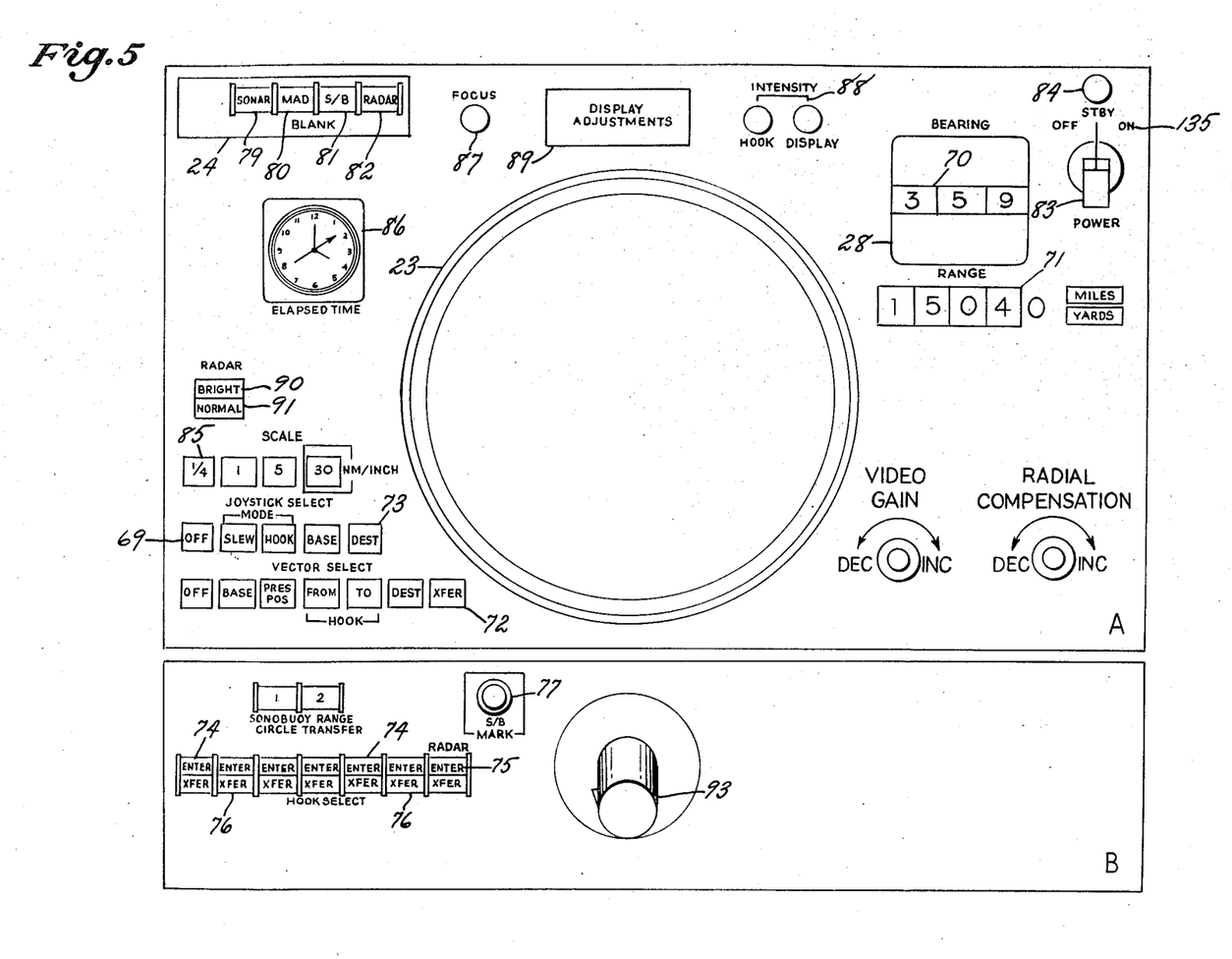
FIG. 5 is a front elevational view of a console used by the tactical coordinator.

Referring to FIG. 5, the tactical coordinator display 23 and display control 24 are similar to the pilot's display. In this case, a 12 inch round cathode ray tube is employed, but the internal modules of both tactical coordinator and pilot display are essentially the same.

The TACO console 67 contains the video tube 68 which is surrounded by the required functional switching for system operation. A joystick control 69 provides for insertion of BASE and DESTINATION data, in conjunction with range and bearing indicators 70 and 71, respectively. Appropriate symbols are displayed indicating BASE and DESTINATION for navigational purposes. The data may be changed at any time during flight, allowing for updating or situation change as required.

The vector selection serves to reference any pair of memorized points, or present position and one memorized point, by employing the controlable hook to designate the point or points. The vector thus computed is displayed at the tactical coordinator display and at the pilot display (if the tactical coordinator presses the vector transfer button 72). Computed vectors will appear on the tactical coordinator's course distance indicator 28 and the base destination heading indicator on the pilot's display (not shown).

Arbitrary point designation of the display in controlled by the joystick 93 in the mode of operation designated by the joystick select push-buttons 73. The assignment of base and destination normally represent a pre-flight set up of the system, while the in-flight operation consists of the slew and hook modes of joystick operation. The term "slew" represents a translation of the pictorial display, and the term "hook" indicates the tactical assignment of significant points of interest.

Up to six hook points plus up to four radar points may be designated my means of the hook select ENTER push-buttons 74. Successive radar points are entered by successively depressing the radar ENTER button 75. Such selection represents the assignment of a memory channel and the display of the hooked point at the TACO display. Such hook points may also be indicated on the pilot's tactical display if the tactical coordinator presses the associated XFER push-buttons 76. When pressed, the buttons 76 become illuminated to indicate to the tactical coordinator the current status of the pilot's tactical display. Pushing the same buttons a second time will remove the associated point or points from the pilot display and will extinguish its illumination. Any assigned hook point (excluding radar) may be removed from memory and display be a second depression of the appropriate ENTER push-button.

Range loci circles, which may be derived from telemetered data of the active sonobuoys, are displayed on the tactical coordinator display. Each range circle will also be shown on the pilot display, if transferred by the tactical coordinator. The coordinates of sonobuoy deployment are memorized as the aircraft navigational coordinates at the time of sonobuoy launch. The tactical coordinator will depress the S/B MARK push-button 77 at the time of buoy deployment to affect such sonobuoy location memorization.

Blanking of tactical points is provided by categories. Blanking may be accomplished by selecting the category push-buttons 79, 80, 81 and 82 to respectively temporarily remove from the display all previously noted points in the selected category, sonar, magnetic anomaly detector, sonobuoy, or radar, respectively. The blanked category (or categories) may be reinserted on the display by again pushing the selected button. The master power switch 83 is employed as a "master erase" in the stand-by position 84, which also serves initially for system warmup.

Independent scale selection, without loss of memory on tactical scales, is provided to the tactical coordinator. These scales are indicated to the pilot for reference purposes by the above mentioned lights 54 which respond to the scale selection switches 85. An elapsed time stopclock 86 is also provided to enable the tactical coordinator to estimate the speed of monitored targets.

Independent focus and intensity controls 87 and 88, respectively, are provided for the display as well as standard "housekeeping" adjustments 89.

The radar display provided to the tactical coordinator is processed by the scan-converter 17 before it is ground-stabilized for proper display, when the tactical coordinator presses the bright radar button 90. When the normal radar button 91 is pressed, raw radar data is ground-stabilized.

SENSOR OPERATOR STATION

The sensor operator serves to monitor all tactical sensors, and initiates the transfer of such data to the tactical coordinator display. The tactical sensory inputs normally available, include dipping sonar target positions derived from a sonar detecting ranging set, magnetic anomaly detection (MAD) position contacts derived from a magnetic detection set and a magnetic detection recorder, and sonobuoy target range lock derived from active ranging sonobuoys, a sonobuoy receiver and a two-channel indicator. As this equipment is already known in the art, the details of the same need not be further considered herein.

The three above mentioned sensory systems are employed on a time-sharing basis, with the possibility for use of two sensors simultaneously. The received information is fed to a sensor data unit 99 (see FIG. 6).

Figure 6:
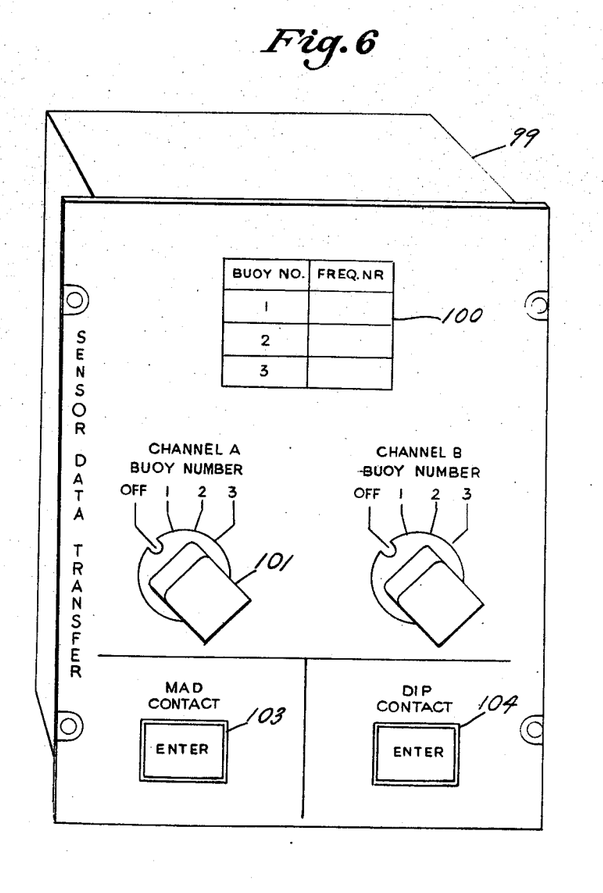
FIG. 6 is a front elevational view of a sensor data unit.

The upper portion of the unit 99 is allocated to the transfer of sonobuoy range data. It is presumed that the correlation between the sonobuoy frequency band (one of 16 assigned frequency bands) and the order of sonobuoy drops will be performed by the sensor operator. Accordingly, a tabulation chart is provided on the panel for the operator to note, via grease-pencil on a back-illuminated translucent surface, the frequency band for each sonobuoy as the buoys are deployed. The location of each buoy is entered on the tactical coordinator display as a hook point.

Upon receiving sonobuoy target returns, the sensor operator will coorelate the corresponding sonobuoy frequency band of the sonobuoy receiver with the buoy reference number. He then identifies the buoy by noting on his tabulated chart 100 the appropriate channel selector number for the button 101. The operator can then monitor the target ranges, and by associating the channel information with the associated sonobuoy, cause the range loci to be displayed at the proper location on the tactical coordinator and pilot displays.

The lower portion of the sensor data unit 99 is allocated to the transfer of MAD and dip sonar data. In "MAD" operation, the sensor operation will depress the ENTER pushbutton 103 to automatically memorize the aircraft navigational coordinates at the time of the MAD contact. This memorized location is immediately displayed to the tactical coordinator and identified as a point of MAD contact.

In dip sonar operation, the sensor operator will depress the push-button 104 to automatically memorize the target coordinates as the vector sum of aircraft position at hovering location and the target vector. This memorized location is immediately and similarly displayed to the tactical coordinator.

SIGNAL PROCESSING

Signal processing in the device 10 occurs in two units; namely the data converter unit 107 and the display programmer 108 (FIG. 7). The former contains the input data converter servos and circuits and power supply. The latter contains the memory modules, the memory servo amplifiers and switching circuits, the programmer and multiplexer circuits, the character generator and the function generator. It will be understood that this division of structure is provided principally for ease in installation and servicing, and may be modified within the scope of the invention.

The data converter unit 107 includes the Northing and Easting navigational input servos 110 and 111, respectively, the sonar range and bearing input converter servos 112 and 113, respectively, and radar input conversion circuitry 114, including sweep generator 115, resolver 116 and radar display converter 117. The power supply 118 is preferably contained within this module. The range bearing converter 119 is mechanically coupled to the radar display converter 117, as is the heading servo 120 which drives the heading servo indicator at the pilot location (BDHI) and the course distance indicator (CDI) at the tactical coordinator display.

The computational problem is classified in two modes, a long-range navigational solution and a tactical problem solution. The long-range navigational mode applies to the 30 nautical mile per inch scale only. In this mode, the display receives BASE and DESTINATION reference points and aircraft present position.

The tactical solution applies to the 5, 1, and 1¼ nautical miles per inch scales. In this mode, the tactical coordinator display presents up to five sonar targets, two MAD contacts, three sonobuoy positions, four radar contacts, two target range circles, and one vector, as well as six hook points. The maximum area coverages are approximately 8,000, 320, and 20 square miles on the 5, 1 and 1¼ nautical mile per inch scales, respectively. On any given scale, the tactical coordinator may view about 20 percent of the available area coverage at any one time. This area is selected by positioning the joystick control. In this mode, the pilot display will either present selected hook, radar, vector and range circles, and/or display scan-converted radar.

At the start of a mission, the system is in the long-range mode, and aircraft present position is displayed at the center of the screen at 30 nautical miles per inch. Remote points (base and destination) are inserted into memory by use of the course distance indicator (CDI) and joystick hook and vector controls. Upon being entered into memory, these points then appear as fixed reference points on the display. As the aircraft flies from the starting point, it is represented on the display by a present position symbol. Hence, aircraft position with respect to the two reference points is presented on the display on a continuous basis.

When a contact is made, the tactical coordinator may switch to one of the three tactical scales. At this point, the position of the aircraft at switchover is established as tactical reference (center of tactical display) for all tactical scales. All tactical points inserted into memory will be referenced to this point. When switching to the one or 1¼ nautical miles per inch scales, the position of the aircraft at switchover is established as current display center, although the initial reference point of switch-over into tactical mode continues as an overall tactical reference. A new tactical reference point may be established by switching into the 30 nautical miles per inch scale, flying to the desired reference point, and then switching back into one of the tactical scales. This invalidates all previous tactical points in storage, and they do not reappear on the screen unless re-entered into storage as new data is accumulated.

DATA CONVERTERS

The navigational data converter 121 is required for conversion of the synchro outputs of the converter servos 110 and 111 (at 2 nautical miles per revolution) into aircraft position coordinate analog voltages appropriate for computation and display. A block diagram of this converter (only one of the two identical channels is shown) appears in FIG. 8.

Figure 8:
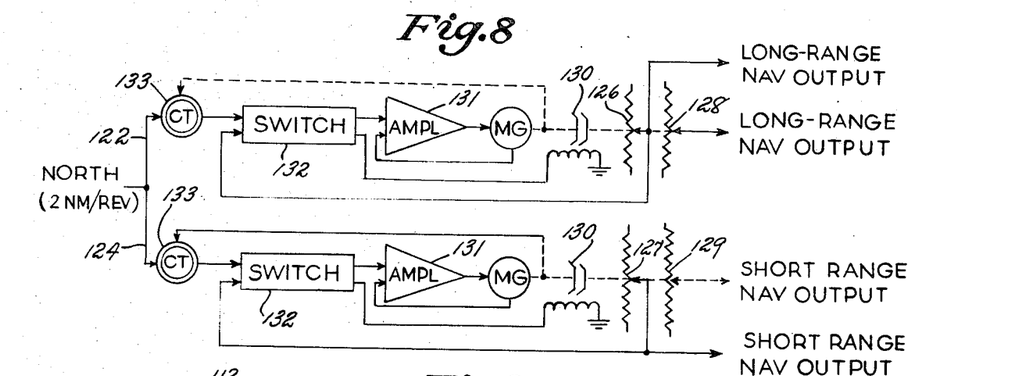
FIG. 8 is a schematic diagram of a navigation input converter.

The converter contains four servos, two for long-range coordinate tracking, one of which is indicated by reference character 122; and two for short-range coordinate tracking, one of which is indicated by reference character 124. Each servo drives an AC excited potentiometer 126–127 to provide computational inputs, and a DC excited potentiometer 128–129 for use at the display. At the start of a mission, the potentiometers are nulled by energizing clutches 130, and switching potentiometer feedback signals into amplifiers 131 via switches 132. At the end of a 15 second interval (as controlled by a time delay relay not shown) the clutches are opened, and the synchro inputs are switched into the amplifiers 131. The servos maintain the synchro control transformers 133 at null. When the tactical coordinator switches the system from standby position to on position 135 (FIG. 5), the clutches at the long-range potentiometers close and aircraft position is tracked by the Northing and Easting potentiometers. When the system is switched to a tactical scale, the short-range potentiometer clutches also engage and the aircraft tactical position (with respect to the tactical switchover point as reference) is maintained on the short-range potentiometers. When the tactical coordinator switches back to the 30 nautical miles per inch scale, the short-range nulling procedure described hereinabove is repeated and the short-range potentiometers are driven back to zero position. The short-range clutches are opened and the control transformers are switched into the amplifiers to close the synchro-loop which maintains them at null.

The sonar input converter 109 (see FIG. 9) is fed by the servos 112 and 113 which receive information from dip sonar in the form of two-speed synchro voltages for range (2,000 and 50,000 yards per revolution) and single-speed synchro voltages for bearing (360° per revolution). These inputs are converted into rectangular coordinate voltages $\Delta X$ and $\Delta Y$ which are then summed with the aircraft present position coordinates $X$ and $Y$, respectively.

Figure 9:
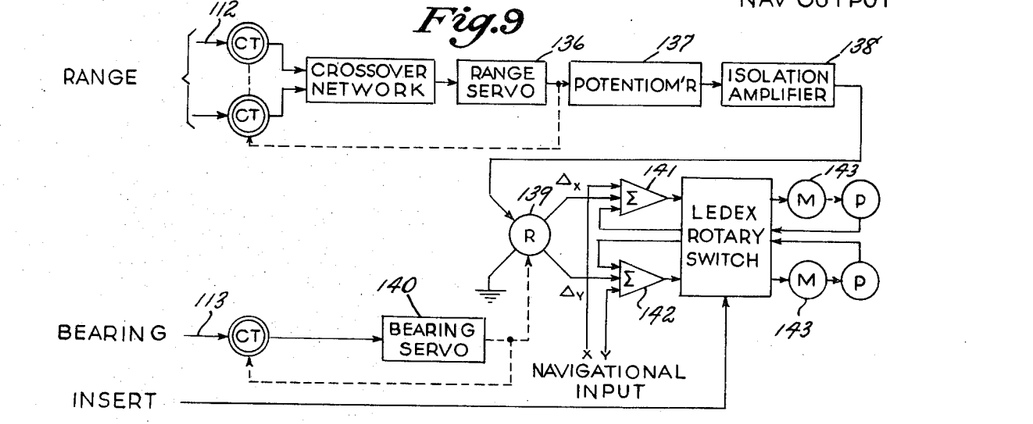
FIG. 9 is a block diagram of a sonar input converter.

A standard two-speed synchro follow up servo 136 drives a potentiometer 137 to a position proportional to the range input. The potentiometer output is fed through an isolation amplifier 138 to a resolver 139 which is positioned to the target bearing angle by a single-speed bearing synchro follow up servo 140. Hence, the resolver outputs are the target coordinates relative to the aircraft. These outputs are added to aircraft navigational coordinates in a pair of summing amplifiers 141–142 which drive a memory module 143 to store the target position coordinates.

The sonobuoy system provides range only inputs to the system in the form of manually positioned potentiometer settings. These ranges are not stored by the display system, but are fed directly to the function generator via the programmer where they are processed for display as discussed hereinafter. (See FIG. 7.)

Figure 10:
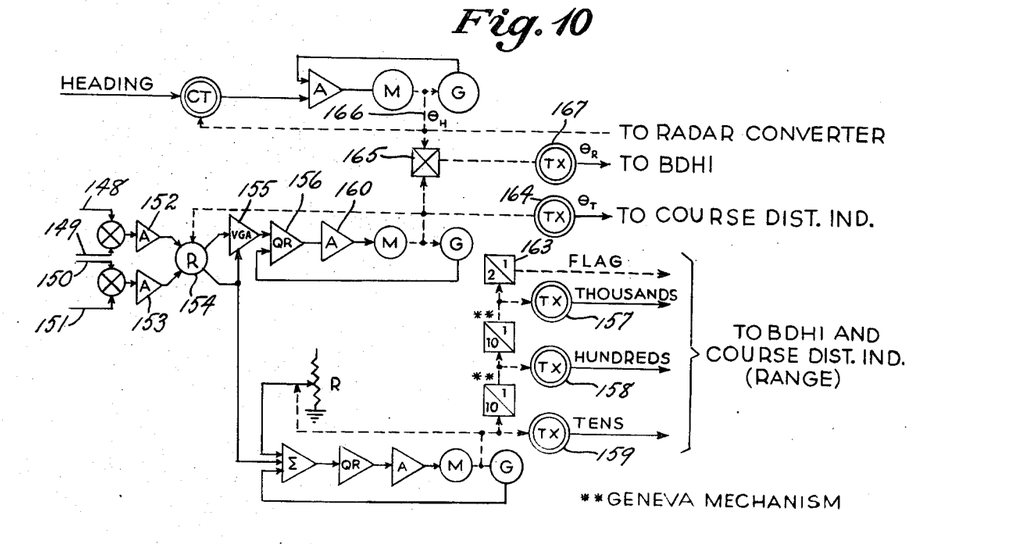
FIG. 10 is a schematic diagram showing a bearing distance heading indicator and course distance indicator data converter.

The bearing distance heading indicator (BDHI) and course-distance indicator which are displayed on the cathode ray tubes at pilot and tactical coordinator locations are essentially vector (polar coordinate) readout devices. The display system, on the other hand, is instrumented for rectangular coordinate data processing. Hence, in order to achieve compatibility between these coordinate systems, a data converter is required (see FIG. 10). The inputs 148, 149, 150 and 151 to this converter are AC voltages representing the coordinates of the vector terminal points with respect to tactical or long-range navigational reference. The converter solves the equations $$(X_1 - X_2) \cos \theta_t = (Y_1 - Y_2) \sin \theta_5 \qquad (1)$$

$$(X_1 - X_2) \sin \theta_t = (Y_1 - Y_2) \cos \theta_t = R \qquad (2)$$

to compute the quantities $\theta_t$ (true bearing) and $R$ (range), respectively. The inputs 148–151 are fed through amplifiers 152–153 to the resolver 154. A variable gain amplifier 155 is required in the solution of equation (1), to compensate for the variation in resolver sensitivity for variable range values. Quadrature rejection units 156 are employed in both computation loops to supress the quadrature signal components generated in the resolver and prevent saturation of the servo amplifiers 160.

The computed range is fed to the BDHI and the CDI by means of three synchro torque transmitters 157, 158 and 159 coupled to the range potentiometer drive shaft. These synchros are geared to each other in successive stepdown ratios of 10:1 by means of a Geneva mechanism (not shown) such that the high speed synchro rotates continuously but the other synchros rotate in increments of 36°. This provides a three digit range output which is compatible with the data requirements of the BDHI. Additionally, a cam actuated switch 163 closes at one half maximum range to control a flag in the indicator which provides a fourth digit by uncovering a numeral "one." The first three digits are reproduced in the indicators by means of three torque receivers each independently coupled to a counter wheel. The maximum indicated range is therefore 199.9 miles. A second (lower) scale is provided in the instrumentation. On this scale the maximum indicated range is 19.99 miles. The choice of scale is based on the selected system scale factor, and is accomplished by changing the range potentiometer excitation voltage.

The computed true bearing $\theta_t$ is fed to the CDI by means of a synchro torque transmitter 164 coupled to the resolver drive shaft. This is followed up in the indicator by a torque receiver which positions a true bearing dial (not shown).

The true bearing $\theta_t$ is also fed to a mechanical differential 165 which obtains vehicle heading from the compass system by means of a synchro follow up servo 166 at its other input shaft and, thus provides relative bearing as an output. The relative bearing is transmitted to the BDHI by means of another synchro torque transmitter 167 where it controls the positioning of relative bearing indicator.

Figure 11:
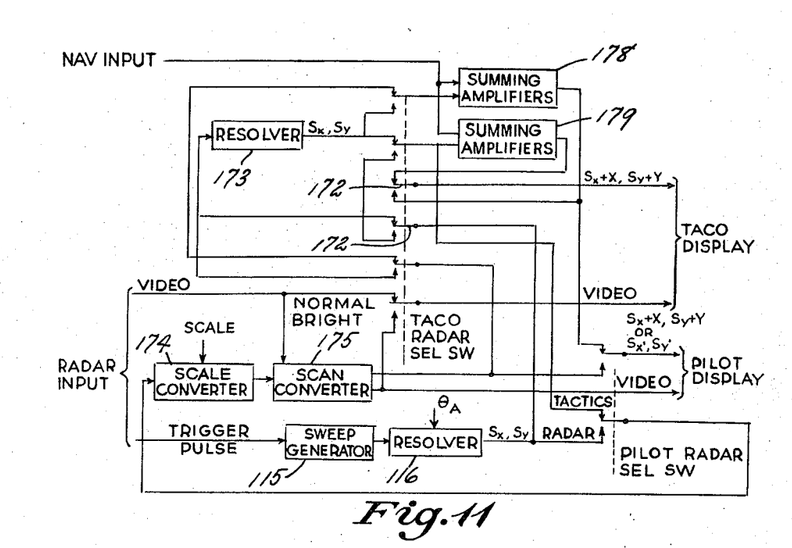
FIG. 11 is a signal flow diagram of a radar display converter.

The radar input display converter 117 accepts the heading-oriented, aircraft stabilized radar output and converts it into North-oriented, ground-stabilized form suitable for presentation on the tactical coordinator display.

Referring to FIG. 11, a trigger pulse from the radar initiates the generation of a ramp sweep signal by the sweep generator 115 which is fed to the resolver 116 driven in synchronism with the radar antenna. By means of the tactical coordinator and pilot radar selector switches, 172 the output of this resolver may be fed to a second resolver 173 (positioned by the heading output of the BDHI and CDI data converter) which compensates the radar input for aircraft heading to provide North-oriented outputs. Alternatively, this resolver output may be fed through a scale converter 174 to a scan converter 175, which generates the bright radar display. Under one set of switch conditions, the antenna resolver drives both the heading resolver and the scan converter. Examination of FIG. 11 indicates that the first situation occurs when the tactical coordinator selects NORMAL radar and the pilot selects TACTICS. The second situation occurs when the tactical coordinator selects BRIGHT radar, and the third situation occurs when the tactical coordinator selects NORMAL radar and the pilot selects RADAR only. For the second situation, the scan converter output drives the heading compensating resolver 173. The scan converter also receives a beam intensification signal (video), and provides a scan converted video output. Two pairs of summing amplifiers 178 and 179 accept radar and navigational inputs and provide ground-stabilized radar outputs for radar super-imposed tactical displays.

Thus, the tactical coordinator display receives either raw or scan converted North-oriented, ground-stabilized radar as selected, and the pilot display independently receives scan converted radar in either North-oriented, ground-stabilized; or heading-oriented, aircraft-stabilized form, as per the pilot's selection. When the tactical coordinator requires a scan-converted display, the independent scale selection feature limits the effectiveness of one of the displays, since the scan converter can operate with only one scale factor. In this situation, the coarser of the tactical coordinator and pilot scale selections is applied to the scan converter. This assures that each operator receives the full radar field selected although only the favored display receives inputs with optimum resolution.

The tactical coordinator, as has been mentioned, is provided with dual radar selection to permit his indicator to display a scan converted (BRIGHT or "normal" radar presentation.

The hook computation is used for entering displayed points into storage and for master slew positioning of the displayed image on the tactical coordinator display. A block diagram of the hook computer 183 appears in FIG. 12, and a pictorial representation of the hook computation appears in FIG. 13. Assume that the basic tactical area for all computation is given by D and the current area in view is D'. The tactical reference point is 0. The position of the current display with respect to the tactical reference is given by the vector OA with coordinates $X_a$, $Y_a$. The tactical coordinator may master slew his display to D'' by inserting the coordinates $(X_b - X_a)$, $(y_b - Y_a)$ into master slew storage by means of the joystick controlled inputs into the hook computer. For this computation, the display coordinates and master slew offset inputs 184 are grounded.

Figure 12:
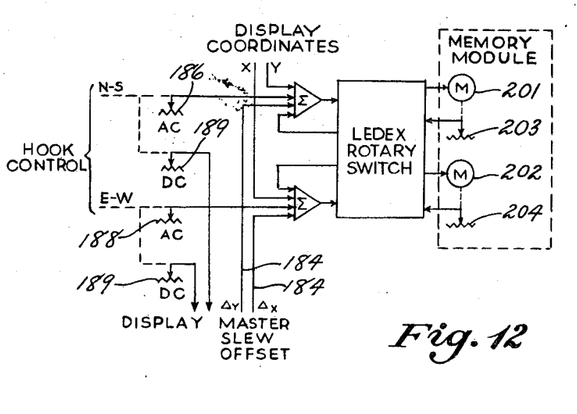
FIG. 12 is a block diagram showing hook computation.
Figure 13:
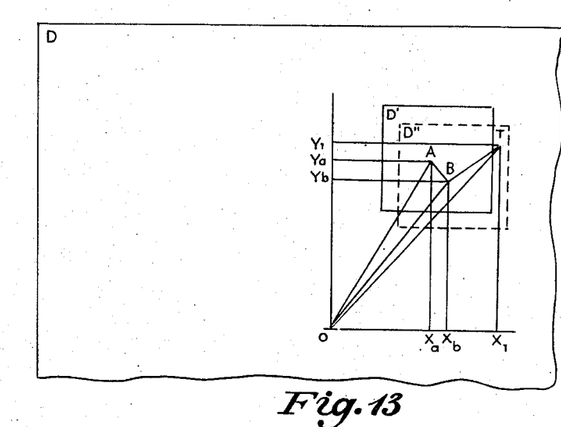
FIG. 13 is a vector diagram showing hook computation.

If the tactical coordinator now wishes to insert the target position T into storage, he must insert the coordinates $X_t$, $Y_t$, even though the target coordinates with respect to his current display are $(X_t - X_b)$, $(Y_t - Y_b)$. This is accomplished as illustrated in FIG. 12 by adding the hook input coordinates $(x_t - X_b)$, $(Y_t - Y_b)$ to the sum of the display center coordinates $X_a$, $Y_a$ and the master slew offset coordinates $(X_b - X_a)$, $(Y_b - Y_a)$. The coordinates $X_a$, $Y_a$ represent aircraft position when the tactical coordinator switches from the display area D to the finer display scale area D' and are entered into storage automatically when the tactical coordinator switches scales.

Two potentiometers are ganged to each coordinate of the hook control. The potentiometers 186 and 188 are excited by AC voltages and the potentiometers 187 and 189 are excited by DC voltage. The AC signals are required for computation and storage, while the DC signals permit simultaneous view of the hook position input at the display while they are being entered into storage. The AC potentiometer excitation is varied in proportion to the tactical coordinator scale selection to assure that a given distance in nautical miles on the display will always be entered into the hook computer as the same voltage on any scale.

Referring again to FIG. 7, the display programmer 108 includes the switching circuits 192, servo amplifiers 193 (memory input), the memory modules 194, the programmer and multiplex circuits 195, the character generator 196, and the function generator 197. The switching circuits consist of rotary switches and relays which control the sequence of entering data points into memory. For example, assuming the entry of successive sonar-derived target positions into memory, the sonar target switch (not shown) is in number one position and the connections to the servo amplifiers are such as to sum the sonar target inputs to the navigational inputs and enter the result into sonar target memory position number one. When the sensor operator presses his sonar target ENTER button, this target position is stored and the switch sequences to position number two in readiness for the second target input. The switch simultaneously pulses a flip-flop associated with target memory module number one which serves to notify the programmer that the point in storage is valid for display.

Additional target points are stored in like manner until all five assigned sonar target memory modules are used. The switch then automatically recycles to position number one to update memory module number one with new target data, and subsequently performs the same function for position number two, etc. The tactical coordinator may temporarily erase all stored sonar target points from the display by actuating his sonar blank button 81. This closes the sonar flip-flop AND gates preventing the sonar target coordinates from entering the display by disabling the associated cathode ray tube unblanking signal. These points are re-entered on the display by pressing the sonar blank button a second time, which opens the AND gates. The erase feature is independent of the storage cycle and points may be entered into storage even though they do not appear on the display. Radar, sonobuoy, and MAD positions are entered into their respective assigned storage modules in similar fashion, except that for the latter two, only the instantaneous position of the aircraft at insert is required for storage. Hook points are inserted individually by the tactical coordinator in any desired sequence and may be updated randomly.

The memory modules are sampled sequentially by the programmer and multiplex circuits, which transmit the memorized coordinates to the display in combination with the appropriate symbology from the character generator and the range circles and vector line from the function generator.

Figure 14:
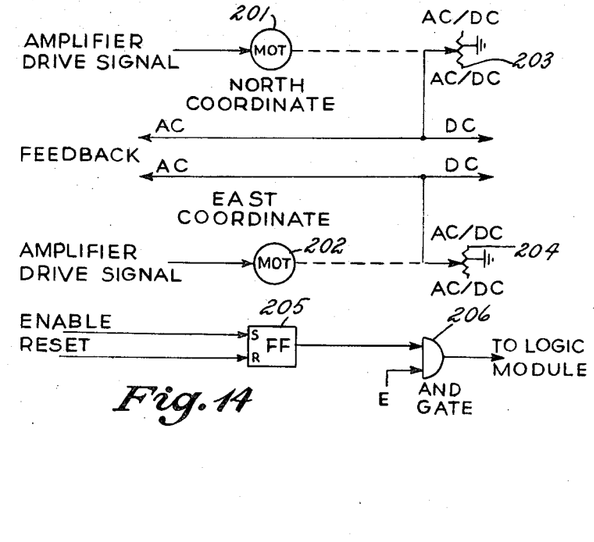
FIG. 14 is a schematic view showing a typical memory module.

A block diagram of a typical memory module is illustrated in FIG. 14. The modules consist of two motors 201 and 202, two ten turn potentiometers 203 and 204 with associated gearing, and a flip-flop 205 and AND gate 206. A total of 26 such modules are employed, plus one modified module with two potentiometers for each coordinate datum. Although the distribution of memory modules as outlined below is considered adequate, where required, other distributions may be employed.

| Data Category | Storage Allocation |
|---|---|
| Sonar Targets | 5 modules |
| MAD Contacts | 2 modules |
| Sonobuoy Locations | 3 modules |
| Radar Targets | 4 modules |
| Hook Points | 6 modules |
| Base Location | 1 modules |
| Destination Location | 1 modules |
| Center Reference Origin | 1 modules |
| Slew Origin | 2 modules |
| Vector Coordinates | 1 standard module and 1 modified module |

When a point is entered into storage, the memory potentiometers are excited with 400 cps AC to provide suitable feedback signals for the memory servos. Once stored, the excitation is switched to DC for compatibility with the display.

The programmer and multiplexer circuits control the sequential flow of data from the memory modules, range inputs, character generator and function generator to the deflection amplifiers 207. The programmer (FIG. 15), generally indicated by reference character 208 consists of a six stage flip-flop counterchain 208a driven by a 4Kc oscillator 209. Thus, each program step is 250 millisecond long. The oscillator 209 also drives a 60 millisecond monostable multivibrator 210 which initiates the cathode ray tube unblanking signal. Each memory potentiometer is fed to its individual analog gate 212. The analog gates are controlled by logic gates (not shown) which in turn are controlled by the programmer outputs and the state of the memory module flip-flop. As the programmer steps through its program steps, each memory module is sampled in sequence and gated out to the deflection amplifiers 207 if its flip-flop indicates that the data is valid. As the cathode ray tube beam slews to the memorized position coordinates, the 60 millisecond monostable multivibrator 210 is on and the beam is blanked. After 60 milliseconds, the multivibrator 210 switches to its inactive state setting the unblanking flip-flop 213 which drives an AND gate 214. If the OR logic 215 detects that the output being sampled is valid, the AND gate 214 allows the cathode ray tube beam to be unblanked and the datum point appears on the tactical coordinator display. At this stage, the character generator is activated to write the required symbols for the datum. The selection and spacing of the symbols is controlled by the programmer. The unblanking flip-flop is reset by the oscillator 209 at the end of each program step, except during vector insertion when it remains set for up to four program steps. This condition is controlled by the reset decoder logic 216. The tactical coordinator cathode ray tube unblanking signal is fed to another AND gate 220 which also receives pilot display command signals from the tactical coordinator console. The output of this gate provides the unblanking signal which permits the selected tactical points to be displayed on the pilot's indicator.

Figure 15:
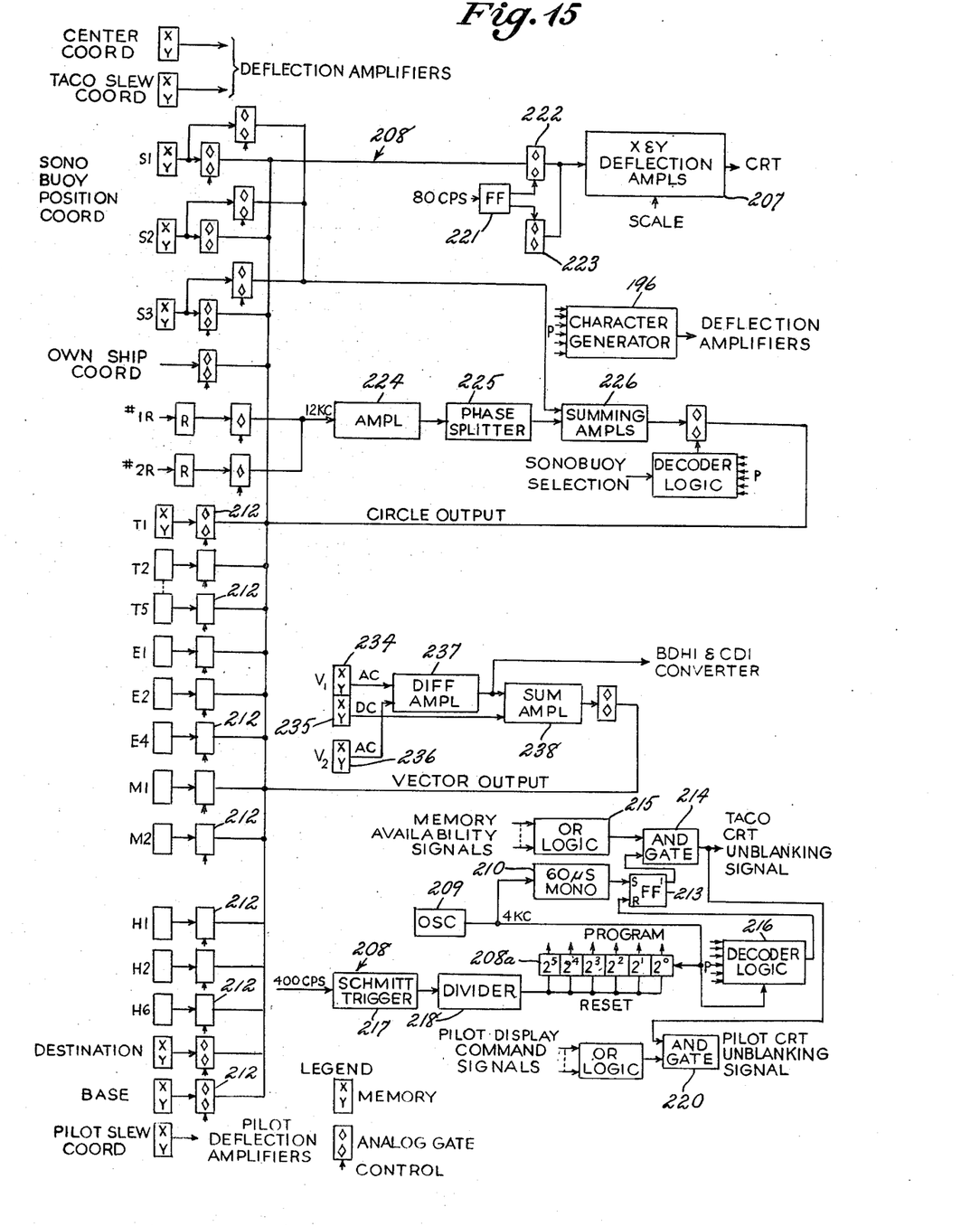
FIG. 15 is a schematic diagram showing programmer, multiplexer, and function generator circuits.

The program is synchronized to the 400 cps line by feeding a 400 cps signal to a Schmitt trigger 217 which drives a scale of five divider 218. The output of the divider is an 80 cps pulse rate which is used to reset the programmer. The 80 cps signal also drives a multiplexing circuit including a flip-flop 221 and two pairs of analog gates 222 and 223. This circuit alternates the inputs to the deflection amplifiers between the memory outputs and the scan converter (or radar) outputs at a 40 cps rate. Hence, the display presents a composite picture including both the memorized data and the radar presentation.

Figure 16:
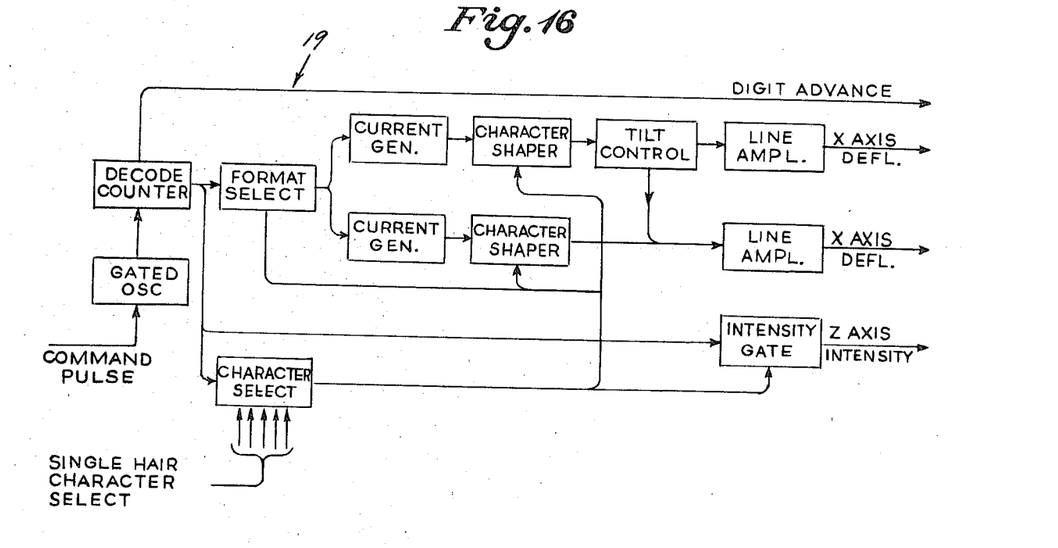
FIG. 16 is a schematic diagram showing a character generator.
Figure 17:
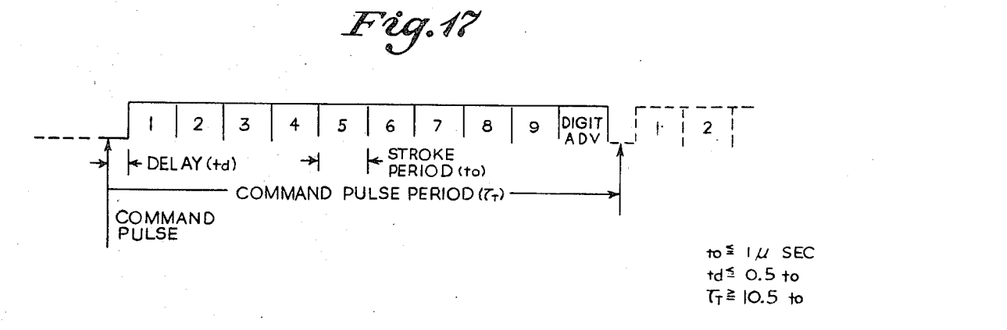
FIG. 17 is a schematic diagram showing timing cycle.

Referring to FIGS. 16 and 17 in the drawings, a presentation of alphanumeric characters and symbols is required for the integrated display system. Suitable for this purpose is a segmented line type of character generator which converts a digital character selection signal into three analog voltages, namely $X$ deflection voltage, $Y$ deflection voltage, and an unblanking signal. The $X$ axis deflection voltage and the $Y$ axis deflection voltage move the beam of the cathode ray tube indicator continuously to outline the desired character, while the unblanking voltage turns the beam on and off at the appropriate time intervals. Devices of this type are known in the art, and, accordingly, consideration of the structural aspects of the same are not further considered in the present disclosure.

To minimize circuit complexity and therefore increase unit reliability, the symbols are generated from two common formats. One format is a simple eight stroke pattern resembling a double hung window with a diagonal line in the upper half that extends from the upper right corner to the lower left corner. THe second format is a six stroke pattern resembling a bow tie. All digits and many letters can be formed by intensifying desired portions of these standard formats. Many arbitrary symbols can also be formed by intensifying selected portions of the basic pattern.

Thus, by selecting the aforementioned formats, the character generator is able to form 32 characters while at the same time requiring a bandwidth of only 15 kilocycles per second of the cathode ray tube deflection amplifiers.

Input data to this structure is in the form of five line binary coded information plus a trigger signal. Automatic format selection is accomplished by internal logic. The desired symbol is generated upon receipt of a correct word from the memory computer along with the trigger signal.

In order to correctly position the selected symbol on the display, the $X$ and $Y$ DC output voltages of the character generator are summed with $X$ and $Y$ DC signals representing coordinate information.

The function generator also provides the $X$ and $Y$ deflection signals required for writing range circles and the vector line on the display (refer to FIG. 15).

Figure 18:
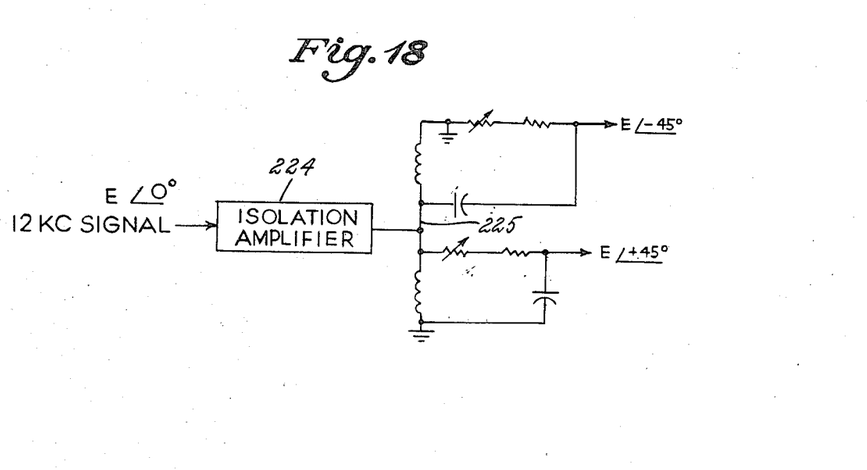
FIG. 18 is a schematic diagram showing a function generator phase splitter.

The range circles are generated by exciting the range potentiometers in the sonobuoy indicator with a 12 kc reference signal. At a predetermined point in the program, the programmer causes one of the range outputs to be gated into an isolation amplifier 224 (see FIG. 18) for four successive program steps. The isolation amplifier drives a phase splitter 225 which splits the range signal into two signals of equal amplitude but quadrature phase. These signals are then fed to a pair of summing amplifiers 226 which also receive the appropriate sonobuoy position coordinates. The resultant outputs are gated to the deflection amplifiers during the fourth program step, causing the cathode ray tube beam to trace out the required range circle. (During the first three steps of the program, the other data points are being traced on the display as discussed hereinabove). The second range circle is process in the same manner during a later portion of the program.

The vector is generated at the beginning of the program. The origin and termination points of the vector are entered into the vector memory modules by means of the hook control. The origin memory module contains two sets of coordinate potentiometers 234 and 235, one set AC excited, and one set DC excited. The termination memory module 236 is standard, but its potentiometers are AC excited. The AC outputs of the two modules are combined in a difference amplifier 237 which extracts the differential vector coordinates $\Delta X$, $\Delta Y$ as AC signals (400 cps). These signals are added to the DC vector origin coordinates in the summing amplifiers 238. (The $\Delta X$, $\Delta Y$ signals are also used to drive the BDHI and CDI converter.)

The vector is constructed during the first six steps of the program, which begins as the 400 cps reference voltage crosses the zero axis in a positive going direction. Hence, during this interval (six steps) the reference signal varies over at least one half cycle, and therefore the vector may be traced by feeding the outputs of the summing amplifiers to the deflection amplifiers and maintaining the unblanking signal constant during these program steps. The unblanking signal is removed when the reference signal crosses zero in a negative going direction.

The radar scan converter 17 performs the function of changing the input radar time base to a more convenient 40 cycle frame rate. In this way, the relatively slow radar data rate is updated and made compatible with the higher display rates required by the other system units. In effect, the scan converter makes it possible to present radar data on a single bright display along with the alpha-numeric symbols and other tactical data.

The technique of time base conversion employed in the scan converter is achieved through the use of a double ended recording storage tube. This tube is known in the art, and comprises, in effect, two conventional tubes back to back, fabricated in a single glass envelope, but without the normal cathode ray tube phosphor. Instead of the phosphor, a dielectric storage screen is substituted. There are two separate electron gun assemblies at opposite ends of the tube, namely a write gun and a read gun. Input signals such as obtained from the airborn radar are used to deflect and intensify the writing gun electron beam. Modulation of the writing electron beam is stored in the dielectric mesh. The storage of input information can be varied from time intervals of seconds to periods of 15 minutes and beyond depending upon the readout rate. The read gun beam is then used to scan the storage mesh surface. Output video signals are generated at the points where the write gun beam has distributed its charge. Since the two electron guns are independent of one another, the tube is capable of simultaneously writing and reading. Stored data in the tube may be erased by merely changing the relative voltage levels between the tube electrodes. Both the reading and writing guns utilize magnetic deflection and can be operated with either electrostatic or magnetic focus or a combination of focus.

To summarize, the input radar information is applied to the write gun, stored and read out at a 40 cycle frame rate. The high readout rate enables the final display tube to use a short persistence, high efficiency, high brightness phosphor. If the raw radar were to be displayed on a cathode ray tube for optimum viewing, the phosphor would necessarily be a long persistence, low efficiency type consistent with the antenna scan rate. The scan converter eliminates this latter requirement, The dual gun storage tube preferably has from 800 to 1200 line resolution, depending upon the method of focusing.

In order to simplify the electronic circuitry, a readout circuitry for the double ended tube is in the form of an interlaced spiral scan. A 12 kc sinusoidal wave is linearly modulated at a 1/30 of a second interval, the alternate phased waveform is generated to form an interlaced readout system thereby conserving output video bandwidth. The frame rate for readout is therefore 1/40 of a second, while the field rate is 1/80 of a second. The spiral scan readout circuitry is considerably simpler component-wise than a conventional television raster scan readout for the same number of active scanning lines. The spiral scan readout also has the advantage that retrace blanking is required only at the end of each field interval, whereas the conventional raster scan requires blanking at the end of each horizontal line. The spiral scan, therefore, has a longer "look" time than the equivalent raster scan.

The scan converter unit contains read and write video amplifiers (not shown), a 10:1 countdown circuit for synchronizing 40 cycle output to the 400 cps line, a 12 kc square wave generator and filter, $X$ and $Y$ magnetic deflection amplifiers for reading and writing, erase circuit control relays, magnetic focus control circuits, linear output sweeps, and miscellaneous gating circuits, all of which are not shown in the drawings, and which are known in the art. The high voltage power supplies for both the write and read gun are contained in the unit as well as all of the low voltage regulated supplies needed for the internal circuitry. In this manner, the scan converter may be a separate independent unit, requiring only 115 volt 400 cps power.

We wish it to be understood that we do not consider the invention limited to the precise details of structure shown and set forth in this specification, for obvious modifications will occur to those skilled in the art to which the invention pertains.

We claim:

1. An integrated display system for combat aircraft comprising: a plurality of data sensors, data storage means for storing data from any of said data sensors, generator means providing one of a symbol, alpha-numeric and function to accompany each bit of data entered into said storage means, first and second cathode ray tube displays located at first and second locations, respectively, programmer means controlling said generator means, and selectively controlling the display of raw data directly from said data sensors, and stored data from said storage means, control means located at one of said first and second locations for manually controlling said programmer means, and second control means at said last mentioned location for manually inserting data into said storage means.

2. Structure in accordance with claim 1, including means for selectively inserting the location of a plurality of tactical and navigational points, and generating vectors interconnecting said points.

3. Structure in accordance with claim 1, further characterized in the provision of means transmitting data to said first tube display, and manually controllable means at said first location for transferring selected portions of received data to said second display.

4. Structure in accordance with claim 3, including means at said first location for temporarily blanking selected data from said second display.

5. Structure in accordance with claim 3, one of said data sensors providing radar information, and means for selectively displaying raw and stored data on at least one of said first and second displays.

6. Structure in accordance with claim 5, including mode selection means controlling said second display for selectively presenting air stabilized and ground stabilized radar data.

* * * * *